(12) United States Patent
Curran et al.

(10) Patent No.: US 8,140,622 B2
(45) Date of Patent: Mar. 20, 2012

(54) PARALLEL METADATA SERVICE IN STORAGE AREA NETWORK ENVIRONMENT

(75) Inventors: Robert J. Curran, West Hurley, NY (US); Roger L. Haskin, Morgan Hill, CA (US); Kuei-Yu Wang-Knop, Poughkeepsie, NY (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 1977 days.

(21) Appl. No.: 10/154,009

(22) Filed: May 23, 2002

(65) Prior Publication Data

US 2003/0220974 A1    Nov. 27, 2003

(51) Int. Cl.
*G06F 15/16* (2006.01)
*G06F 7/00* (2006.01)
(52) U.S. Cl. .................. 709/205; 709/219; 707/704
(58) Field of Classification Search .................. 709/205, 709/208, 210–211, 217–219; 725/92–93, 725/145–146; 707/8
See application file for complete search history.

(56) References Cited

U.S. PATENT DOCUMENTS

| | | | |
|---|---|---|---|
| 5,111,457 A | 5/1992 | Rabjohns et al. |
| 5,333,314 A | 7/1994 | Masai et al. |
| 5,355,453 A | 10/1994 | Row et al. |
| 5,437,022 A | 7/1995 | Beardsley et al. |
| 5,586,289 A | 12/1996 | Chin et al. |
| 5,708,668 A | 1/1998 | Styczinski |
| 5,724,501 A | 3/1998 | Dewey et al. |
| 5,737,523 A | 4/1998 | Callaghan et al. |
| 5,778,429 A | 7/1998 | Sukegawa et al. |
| 5,813,016 A | 9/1998 | Sumimoto |
| 5,828,876 A | 10/1998 | Fish et al. |
| 5,862,325 A | 1/1999 | Reed et al. |
| 5,922,077 A | 7/1999 | Espy et al. |
| 5,928,367 A | 7/1999 | Nelson et al. |
| 5,930,801 A | 7/1999 | Falkenhainer et al. |
| 5,931,918 A | 8/1999 | Row et al. |
| 5,940,838 A | 8/1999 | Schmuck et al. |
| 5,940,841 A | 8/1999 | Schmuck et al. |
| 5,941,972 A | 8/1999 | Hoese et al. |
| 5,946,686 A | 8/1999 | Schmuck et al. |
| 5,950,199 A | 9/1999 | Schmuck et al. |
| 5,950,203 A | 9/1999 | Stakuis et al. |
| 5,956,734 A | 9/1999 | Schmuck et al. |
| 5,959,860 A | 9/1999 | Styczinski |
| 5,960,446 A | 9/1999 | Schmuck et al. |

(Continued)

OTHER PUBLICATIONS

Curran et al., Pending U.S. Appl. No. 09/887,533, filed Jun. 25, 2001, Assignee: IBM.

(Continued)

*Primary Examiner* — Peling Shaw
(74) *Attorney, Agent, or Firm* — Dennis Jung, Esq.; Blanche E. Schiller, Esq.; Heslin Rothenberg Farley & Mesiti P.C.

(57) ABSTRACT

A method for data access in a multinode, shared storage data processing environment is provided by enhancing the file locking mechanism structure so as to permit nodes not normally designated as metadata controller nodes to fulfill that function for limited times thus at least temporarily eliminating the need for continual node-to-node coordination. This is particularly advantageous in the access and transfer of large files such as video files or files containing complex visualization data.

7 Claims, 4 Drawing Sheets

U.S. PATENT DOCUMENTS

| | | | |
|---|---|---|---|
| 5,963,963 | A | 10/1999 | Schmuck et al. |
| 5,974,424 | A | 10/1999 | Schmuck et al. |
| 5,987,477 | A | 11/1999 | Schmuck et al. |
| 6,021,508 | A | 2/2000 | Schmuck et al. |
| 6,023,706 | A | 2/2000 | Schmuck et al. |
| 6,032,216 | A | 2/2000 | Schmuck et al. |
| 6,052,785 | A | 4/2000 | Lin et al. |
| 6,052,795 | A | 4/2000 | Murotani et al. |
| 6,078,999 | A | 6/2000 | Raju et al. |
| 6,088,717 | A | 7/2000 | Reed et al. |
| 6,148,414 | A | 11/2000 | Brown et al. |
| 6,161,104 | A | 12/2000 | Stakutis et al. |
| 6,173,293 | B1* | 1/2001 | Thekkath et al. ............ 707/201 |
| 6,185,663 | B1 | 2/2001 | Burke |
| 6,208,918 | B1 | 3/2001 | Ando et al. |
| 6,212,606 | B1 | 4/2001 | Dimitroff |
| 6,219,693 | B1* | 4/2001 | Napolitano et al. .......... 709/203 |
| 6,253,236 | B1 | 6/2001 | Troxel et al. |
| 6,260,120 | B1 | 7/2001 | Blumenau et al. |
| 6,269,371 | B1 | 7/2001 | Ohnishi |
| 6,279,078 | B1 | 8/2001 | Sicola et al. |
| 6,308,168 | B1 | 10/2001 | Dovich et al. |
| 6,321,254 | B1 | 11/2001 | Meyer et al. |
| 6,324,581 | B1 | 11/2001 | Xu et al. |
| 6,341,340 | B1 | 1/2002 | Tsukerman et al. |
| 6,351,776 | B1 | 2/2002 | O'Brien et al. |
| 6,389,420 | B1* | 5/2002 | Vahalia et al. .................... 707/8 |
| 6,438,661 | B1 | 8/2002 | Beardsley et al. |
| 2001/0052073 | A1 | 12/2001 | Kern et al. |
| 2003/0204856 | A1* | 10/2003 | Buxton ......................... 725/120 |
| 2003/0208767 | A1* | 11/2003 | Williamson et al. ............ 725/93 |

OTHER PUBLICATIONS

Curran et al., Pending U.S. Appl. No. 09/877,520, filed Jun. 25, 2001, Assignee: IBM.

Beardsley et al., U.S. Appl. No. 10/143,119, filed May 9, 2002, Continuation, Assignee: IBM.

Bilan et al., "Deriving Unique Names in Distributed Storage Management Environments," IBM Technical Disclosure Bulletin, vol. 36, No. 5, May 1993, pp. 287-290.

Ball et al., "Analog Shift Sampling System," IBM Technical Disclosure Bulletin, vol. 23, No. 3, Aug. 1980, pp. 1152-1153.

Grohoski et al., "Shared memory Cluster—A Scalable Multiprocessor Design," IBM Technical Disclosure Bulletin, vol. 37, No. 06A, Jun. 1994, pp. 503-507.

Yan et al., "Resource Management in Software-Programmable Router Operating Systems," IEEE Journal on Selected Areas in Communications, vol. 19, No. 3, Mar. 2001, pp. 488-500 (abstract only).

Templin PJ, Jr., "Providing a Centralized File Sharing Resource at Bucknell University," ACM Siguccs, User Services Conference, Branching Out, pp. 289-292, Published: New York, NY, USA,1998 xvii+301 (Abstract only).

Hanner et al., "Managing Windows NT(R) File Systems Persmissions—a Security Tool to Master the Complexity of Microsoft Windows (NT(R) File System," Journal of Network and Computer Applications, vol. 22, No. 2, pp. 119-131, Apr. 1999 (Abstract Only).

Ashley et al., "An Implementation of a Secure Version of NFS Including RBAC," Australian Computer Journal, vol. 31, No. 2, pp. 54-60, May 1999 (Abstract only).

Pomeroy et al., "Private Desktops and Shared Store," Proceedings 14th Annual Computer Security Applications Conference, pp. 190-200, Published: Los Alamitos, CA, USA, 1998, pp. xiii_365 (Abstract only).

Thekkath, et al., "Frangipani: A Scalable Distributed File System," Operating Systems Review, vol. 31, No. 5, pp. 224-237, Dec. 1997 (Abstract only).

Vasuki et al., "Optimal Allocation of Clients to File Servers," Computer Communications, vol. 20, No. 10, pp. 863-872, Sep. 1997 (Abstract only).

Skipitaris et al., "Experiences with DFS as a File System in the Norwegian MetaCenter for Supercomputing," High-Performance Computing and Networking. International Conference and Exhibition HPCN Europe 1996. Proceedings, pp. 992-993, Published: Berlin, Germany, 1996, pp. xxv+1040 (Abstract only).

Yamada et al., "Secure Document Management for Public Database Sector," Transactions of the Information Processing Society of Japan, vol. 34, No. 5, pp. 1206-1216, May 1993 (Abstract only).

Campbell et al., "Considerations of Persistence and Security in Choices, An Object-Oriented Operating System," RPT. No. UIUCDCS-R-91-1670, Mar. 1991, pp. 14 (Abstract only).

Wedde et al., "Distributed Management of Replicated and Partitioned Files Under Dragon Slayer," Proceedings. Fourteenth Annual International Computer Software and Applications Conference, pp. 436-441, Published: Los Alamitos, CA, USA, 1990, pp, xix-739 (Abstract only).

Robertson, GG, "Cooperating File Systems for a Local Network," Digest of Papers, Hardware and Software Issues for Mass Storage Systems, Fifth IEEE Symposium on Mass Storage Systems, pp. 33-36, Published: New York, NY, USA, 1982, pp. vi+137 (Abstract only).

Santry et al., "Elephant: the File System that Never Forgets," Proceedings of the Seventh Workshop on Hot Toipics in Operting Systems, pp. 2-7, Published: Los Alamitos, CA, USA, 1999, pp. xxxi+197 (Abstract only).

Druschel et al., "PAST: a Large-scale, Persistent Peer-to-peer Storage Utility," Proceedings Eighth Workshop on Hot Topics in Operating Systems, pp. 75-80, Published: Los Alamitos, CA, USA, 2001, pp. xxx+192 (Abstract only).

Roe et al., "The Evolution of WATSTAR, a Microcomputer Network" Proceedings of the Fourth Canadian Symposium on Instructional Technology, pp. 399-405, Published: Ottawa,Ont., Canada, 1983, pp. xvi+595 (Abstract only).

Stakutis and Haselton, Pending U.S. Appl. No. 09/687,390, filed Oct. 13, 2000, Assignee: IBM.

* cited by examiner

PARALLEL METADATA SERVICE IN STORAGE AREA NETWORK ENVIRONMENT

BACKGROUND OF THE INVENTION

The present invention is generally directed to systems and methods for accessing data in a multinode, shared storage data processing network. In particular, the present invention is directed to the use of what is, in effect, a plurality of metadata controllers (also referred to herein as metadata controller nodes or metadata control nodes) which provide application systems with time limited control for accessing individual files and file structures. Even more particularly, the present invention is directed to systems and methods for use in conjunction with storage area networks so as to allow them to operate in a manner which alleviates certain bottlenecks which are especially associated with access to and transmission of large files such as those relating to real time video images and/or complex visualization data. In a second aspect of the present invention, since the present invention employs the concept of having multiple metadata controllers with the level of control implemented being present at the granularity of individual files with temporal limitations, methods and systems for recovery from various forms of node failure are also provided which are consistent with this state of affairs. In a third aspect of the present invention a file locking mechanism is provided which permits the running of application programs on nodes which also operate as metadata control nodes; in particular, these application programs are thus provided with the ability to access, in a consistent manner, the same file data as is accessed from application nodes. The locking mechanism herein provides a mechanism for the more efficient use of numerically intense applications running on parallel metadata control nodes while visualization operations providing "views into the existing data" are provided by less critical application programs running on the other nodes (that is, in other words, on application nodes which are also referred to herein as non-metadata controller nodes). In a fourth aspect of the present invention, a method of access is provided which involves the use of a storage gateway which exists as an independent mechanism for verifying the appropriateness of access from application nodes which have received metadata control information from metadata controller nodes as part of their time limited grant of more direct access. This latter aspect increases the level of security by directly providing, in an independent manner, information regarding access to the storage gateway (or, if you will, storage node) from one of the metadata controller nodes. At the gateway, this affords an opportunity for a check or comparison to be made to insure that the "lease" has not expired and that the enumeration of blocks and their locations are accurate and that no tampering has occurred.

Since the present invention is closely involved with the concepts surrounding files, file systems and metadata, it is useful to provide a brief description of at least some of the pertinent terms. A more complete list is found in U.S. Pat. No. 6,032,216 which is assigned to the same assignee as the present invention. This patent is hereby incorporated herein by reference. However, the following glossary of terms from this patent is provided below since these terms are the ones that are most relevant for an easier understanding of the present invention:

Data/File system Data: These are arbitrary strings of bits which have meaning only in the context of a specific application.

File: A named string of bits which can be accessed by a computer application. A file has certain standard attributes such as length, a modification time and a time of last access.

Metadata: These are the control structures created by the file system software to describe the structure of a file and the use of the disks which contain the file system. Specific types of metadata which apply to file systems of this type are more particularly characterized below and include directories, inodes, allocation maps and logs.

Directories: these are control structures which associate a name with a set of data represented by an inode.

Inode: a data structure which contains the attributes of the file plus a series of pointers to areas of disk (or other storage media) which contain the data which make up the file. An inode may be supplemented by indirect blocks which supplement the inode with additional pointers, say, if the file is large.

Allocation maps: these are control structures which indicate whether specific areas of the disk (or other control structures such as inodes) are in use or are available. This allows software to effectively assign available blocks and inodes to new files.

Logs: these are a set of records used to keep the other types of metadata in synchronization (that is, in consistent states) to guard against loss in failure situations. Logs contain single records which describe related updates to multiple structures.

File system: a software component which manages a defined set of disks (or other media) and provides access to data in ways to facilitate consistent addition, modification and deletion of data and data files. The term is also used to describe the set of data and metadata contained within a specific set of disks (or other media). While the present invention is typically used most frequently in conjunction with rotating magnetic disk storage systems, it is usable with any data storage medium which is capable of being accessed by name with data located in non adjacent blocks; accordingly, where the terms "disk" or "disk storage" or the like are employed herein, this more general characterization of the storage medium is intended.

Metadata controller: a node or processor in a networked computer system (such as the pSeries of scalable parallel systems offered by the assignee of the present invention) through which all access requests to a file are processed. The present invention is particularly directed to systems and methods of operation employing a plurality of metadata controllers together with a mechanism for their coordinated usage.

The data processing systems described in U.S. Pat. Nos. 6,161,104 and 5,950,203 illustrate a mechanism in which two or more computing systems, which share a network path to a storage device, effectively share fast access to files contained on the storage device(s). This is achieved by one of the systems serving as the metadata controller for the file system with the other systems acquiring metadata from the metadata controller to allow direct access to the blocks which makeup the files. Only a single metadata controller is present in the systems shown in these two patents. This single metadata controller (MDC) interprets and creates metadata which describes the locations of files on the shared disks. This method allows non-metadata nodes to bypass the metadata controller on their access to data. This procedure has the potential for increasing data access performance for applications such as video streaming or for certain scientific applications which access large files. It is, nonetheless, characterized by the limitation of having but one metadata controller. Thus, even though metadata is made available to other nodes or computer systems in the network, ultimately there is but a single source for this information; and most importantly, there is but a single source for this information at a point in time when more immediate sources for this information would have been able to alleviate a bottleneck.

In systems of the present invention, this bottleneck problem is alleviated through the use of a special locking mechanism and the granting of temporary permission for direct file access from a class of nodes whose function is principally directed to running application programs. Another class of nodes is capable of obtaining these locks from a node containing a file system manager. However, it is noted that, in general, locks may be obtained from any central lock issuing authority or mechanism, not just from a node containing a file system manager, even though this is the preferred approach in systems of the present invention. These locks do not have a temporal limitation. However, this class of nodes (referred to herein as being Class A nodes or, equivalently, as being in a first plurality of nodes) is capable of granting temporary access to one or more nodes in the set of nodes used for running application programs. For the duration of the permission grant (referred to herein as the "lease term" or "lease period"), consistent access to file level data is guaranteed to be available from an application node which is provided with metadata information from one of the nodes from the first set of nodes (the Class A or metadata controller nodes) class. The class of nodes which are capable of acting as metadata controllers is referred to herein as being members of a first plurality of nodes. The other class of nodes, namely the ones which are capable of directly accessing an individually specified file, typically constitute what is referred to herein as a second plurality of nodes, also referred to herein as Class B nodes or application nodes, since that is their typical role, namely the running of user application programs requiring file access.

Accordingly, at any given time it is now possible to have a plurality of files in an open state with each file being accessed directly from an application node and with a first plurality of nodes actively operating as metadata controller nodes for various ones of these open files. As a result of this new state of affairs, the situation of node failure is also considered herein since failure recovery modalities should now consider the fact that a metadata controller node has surrendered at least some of its authority over file access, albeit temporarily. For example, one of the problems considered and solved herein is the failure of a single node (a Class A node) which acts as a metadata controller node. Also addressed is the problem that occurs if and when there are multiple node failures, and the failed nodes are all metadata controller nodes (Class A nodes) but none of the failed nodes is the node acting as the file system manager. Yet another problem addressed herein relates to the use of multiple metadata controller nodes and the specific circumstance that at least two nodes have failed and the failed nodes include one of the (Class A) metadata controller nodes and the node acting as the file system manager. In all three of these cases, if the only failure is at a metadata controller node (Class A node), the scope of recovery is limited to the files known to be locked at that node. If failure occurs at the node acting as the file system manager, the scope of possible locking is considered to be the entire file system. While the node classes have been referred to above as having a plurality of members, as is typically and preferably the case, it is still within the scope of the present invention that there be a single node in each class. It is noted though, that while such a configuration (that is, single node in each class) is possible within the scope of activity contemplated for the procedures of the present invention, the advantages of being able to rely on a plurality of nodes for metadata controller operations is no longer possible in this very limited mode of operation.

SUMMARY OF THE INVENTION

In accordance with a preferred embodiment of the present invention a method for accessing data in a shared storage environment is provided which includes the steps of: establishing metadata file system control structures on at least some of a plurality of data processing nodes which share access to a set of data storage devices; requesting, from a first one of the nodes, access to a file which is resident within the set of storage devices, through one of the metadata control structures present on a second one of the nodes; granting permission to the first one of the nodes, in response to the request, to directly access the subject file from the first one of the nodes for a limited time by acquiring a lock for the second node, wherein the lock includes permission for the second node to act in the capacity of a metadata controller node, and by transferring metadata information to the first one of said nodes; and accessing the file during the limited time from the first node. The second node acts as a metadata controller node insofar as it is thereafter able to perform certain file access related operations such as a read or write operation. It is, however, not permitted to perform a "file delete" operation.

More generically, the present invention provides a method for accessing data in a multinode, shared storage environment. This storage is shared by two classes of nodes one of which is capable of acting as a metadata controller and the second class may not act as a metadata controller, but may run applications requiring access to the data. Permission is granted to access a file resident within the shared storage environment from one of the nodes in the second class through a request to any node in the first class. The specific node in the first class becomes the metadata controller for this specific file through the use of a file locking mechanism.

In the typical environment in which the present invention is found to be most useful, there are present a plurality of data processing nodes. In general, these nodes can fall into two classes. A first class (Class A) of nodes operate as metadata controller nodes. A second class of nodes (Class B) operate as application servers. When an application running on one of the nodes from this class (Class B) requests data from a file, the request is processed by contacting any one of the nodes from the first class of nodes (Class A) to act as the metadata controller for that file. The Class A, or metadata controller node, then contends for the lock from the file system manager so that it may act as the metadata controller node for the subject file. Before the request for file access is made, when there is no application accessing the file, the default state is that all nodes capable of being the metadata controller for the file system (Class A nodes) are also capable of being the metadata controller for the specific file; but none actually is. Thus, in the primal state, when no access is currently directed to a specific file, there is no node acting as the metadata controller for the file. The application node (a Class B node) requests one of the potential metadata controller nodes from Class B for access to the file. That node obtains a lock and becomes the metadata controller for the file until it is released from that role when the file is no longer being accessed. The limitation to the existence of a single metadata controller can give rise to system bottlenecks and unnecessary overhead. In contrast, the present invention permits a finer degree of granularity in determining which one of the nodes has the potential of acting as the metadata controller node. As a metadata controller node the lock mechanism of the present invention permits file level access directly from an application node (Class B node) but only for a limited, though typically very easily sufficient, period of time. This mechanism is provided through the issuance of a special class of lock. Accordingly, one of the significant features of the present invention is that an application node, which is not itself acting as a metadata controller node, is still able to directly access the disk blocks that make up a file. Thus, access through a specific metadata controller node is no longer required, particularly since it is easy to select the periods for the "lease" interval to be sufficiently long to permit full and complete data access and transfer to occur. Furthermore, in preferred embodiments of the present invention, the lease is renewed (regranted) during a previously granted lease period, whenever necessary due to the such factors as system parameters and the size of the file.

With particular reference to the present invention, other than an indicator state which says that no lock is being held, the lock employed in this aspect of the present invention includes two states. A first state permits the metanode for the file to grant leases without "consulting with" other metadata controller nodes. A second state provides the ability to grant a lease in conjunction with a previously assigned metanode for the file.

Since file access is permitted from a node which is not a metadata controller node, consideration is now also given to desirable methods for failure recovery. Three possible failure scenarios are therefore considered herein. The first failure scenario is the failure of a node which is acting as a metadata controller. The second failure scenario is the failure of multiple metadata controller nodes when none of the failed nodes is the file system manager. The third failure scenario is the failure of a metadata controller node and the file system manager node. The third failure situation is the most difficult to resolve since a second copy of the lock for the affected files is contained at the file system manager, which is simply the Class A node which issues locks.

If only the metadata controller node fails, the scope of recovery is limited to the files known to be locked at that node. If both the file system manager and another metadata controller node fail, the scope of possible locking is considered to be the entire file system. This dual scope is covered for the non-metadata controller case in U.S. Pat. No. 5,987,477.

To be specific, in a data processing system having a plurality of nodes which access shared data storage, when there is provided a first set of nodes operating as metadata controllers with at least one of them providing temporary access to a specific file so that this file is directly accessed from a non-metadata controller node, there is a desirable extension of the present invention which provides a failure recovery method. This method begins with the step of detecting a failure of one of the metadata controller nodes. Once this failure is detected, lock recovery occurs on the files without metadata controller locks. Then, after a delay which is consistent with the time limited access, lock recovery occurs for the files having metadata controller locks. The aspect of having to consider the existence of temporary is an aspect of failure recovery that previously did not have to be factored in to any failure recovery method. Furthermore, when the failure of a metadata controller node is detected at the non-metadata controller node, a request for renewal of the access "lease" is made from this latter node. This request can even be made to the failed node since, if it has recovered, it is typically in the best position to grant the lease renewal and its temporary failure may be totally unrelated to accessing the subject file.

Given that the inventions herein provide a mechanism for the use of metadata controller nodes and a further mechanism which gives other nodes (application nodes) time limited file level access, it is seen that even further improvements can be made in multinode, shared storage data processing systems having these characteristics. In particular, it is seen that it now becomes possible to also employ the metadata controller nodes to run application programs. In order to provide this capability in its most useful form, two kinds of file locking mechanisms are employed. The locking described above, which allows a node to become a metadata controller for a file, is extended to interact with the basic locking provided for parallel applications as described in U.S. Pat. Nos. 5,987,477; 6,023,706 and 6,032,216. The Metadata Controller locking does not conflict with the ability of parallel applications to read or to overwrite existing data. It does conflict with the ability to relocate data blocks, truncate files, delete files or extend files if the Metadata Controller client has requested data blocks to extend the file. Accordingly, file locking in this third aspect of the present invention is provided so as to accommodate such conflicts. If an application running on a Metadata Controller capable node requests these services, the request is queued until the next time that the Metadata Controller is requested to renew the lease on the file. The renewal is rejected with a code indicating that the lease should be returned (or allowed to expire) and a subsequent request for the lease is honored when the Metadata Controller resident application completes its operation. The non-Metadata Controller capable application node then recognizes that the blocks which make up the file may have changed while it did not have the lease and then purge any cached metadata.

This locking mechanism has the advantage that numerically intensive applications may be run on parallel metadata controller nodes while related applications can be run on the application nodes. In particular, these related applications include visualization programs which provide a close to real time indications of numerically intense simulation activities running on the metadata controller nodes.

Since the aspects of the present invention considered so far include the transmission of metadata control information to an application node, it also becomes desirable to add additional security features to the present invention to insure that application node programming is prevented from using the metadata control information, transmitted to it for the purposes of easier file access, to use, change or corrupt that information, either accidentally or purposefully, in any manner that is inconsistent with the lease grant. For example, inconsistent use would include attempted access following the expiration of the "lease" period. Accordingly, in this aspect of the invention, a storage node or gateway is provided. Such gateways are typically most useful in situations in which the number of physical communication connections to an array of disks is simply too great to be accommodated. With the gateway, all access to the disk array (or other storage system or network) passes through the gateway itself. This does not mean that an applications node is not permitted to access data blocks using metadata control information that has been passed to it. This still occurs in a manner consistent with the limited time "lease" permissions discussed herein. However, access requests are passed through the storage gateway. In order to provide the desired increase in the level of security, prior to access from an application node, the storage gateway is provided with a list of data blocks (typically disk blocks) along with the identification of the application node that has been granted the time limited access and which is now making access requests based on that "lease" grant. The storage gateway is also provided with information concerning the duration of the "lease" grant to the application node. Typically the disk blocks are those associated with a single file, as defined by the metadata control structure information, though this is not an essential feature of the present invention in its broadest aspects. The storage gateway is thus enabled to verify the validity of the request by comparison with metadata file control information which is communicated to the gateway directly from at least one of the metadata controller nodes.

The present invention is directed not only to a method for carrying out the above described processes but also to a multinode data processing system coupled to shared storage devices which contain the file being accessed, wherein at least one of the nodes possesses storage which contains program code for carrying out the recited access and recovery processes. Furthermore, the present invention also includes a computer readable medium containing the program code for carrying out these steps.

Accordingly, it is an object of the present invention to eliminate a bottleneck in the transfer of data in a multinode, shared storage environment.

It is also an object of the present invention to facilitate the transfer of data from large files, particularly from those files which contain video or similar large data objects.

It is a still further object of the present invention to enhance the transfer of data from files which store complex numerical data which is required for rapidly executing numerical processing applications, particularly those used for data and process visualization.

It is another object of the present invention to provide lock structures which serve to expand the number of nodes which are capable of performing metadata control functions.

It is yet another object of the present invention to provide a capability in which nodes may assume the role of metadata controller for a specific file without requiring them to permanently function in that role.

It is also an object of the present invention to provide the capability for metadata control at the file level, as opposed to its being at the file system level.

It is a still further object of the present invention to provide at least some metadata control capabilities to the data processing node which is currently most closely associated with the use of a particular file.

It is a further object of the present invention to provide enhanced file locking structures in a multinode, shared storage data processing environment.

It is yet another object of the present invention to enhance data access operations in a storage network environment.

It is also an object of the present invention to provide for repeated file access by renewing the lease while a previous lease period is still in effect.

It is another object of the present invention to provide a method for recovery from certain node failures.

It is yet another object of the present invention to permit a recovery path in which a failed node, upon recovery, is enabled to continue its ability to grant file access "leases."

It is also an object of the present invention to provide a recovery modality which includes failure of one of the metadata controller nodes.

It is a still further object of the present invention to provide a failure recovery method which respects the existence of the grant of temporary direct file access from a different node.

It yet a further object of the present invention to provide a failure recovery process that is effective under as many failure scenarios as possible.

It is also another object of the present invention to permit an application node to request a lease grant for file access from a set of metadata controller nodes other than from the node that originally failed.

It is also an object of the present invention to provide a locking mechanism which permits application programs to run on metadata controller nodes.

It is a still further object of the present invention to provide a lock issued to metadata controller nodes which permits read and write file access but only to existing blocks of file level data.

It is yet another object of the present invention to provide a locking mode which conflicts with the existence of a lease granted to an application node which thereby permits a metadata controller node to relocate or delete blocks of the file.

It is yet another object of the present invention to provide efficient mechanisms for data visualization programs to have access to data which is being concurrently manipulated by numerically intense programs running on metadata controller nodes.

It is also an object of the present invention to prevent application nodes from using changing or corrupting metadata controller information in any manner which is inconsistent with the grant of access permission to the application node.

It is a further object of the present invention to provide increased security without the need to add authentication key data structures to the disk subsystem or to the storage gateway.

It is a still further object of the present invention to increase the available level of security without the necessity of changing the structure of the files, the disks, the file systems or the control flow which is used to access the disks, thus permitting standard disk access protocols to be usable without modification.

It is a yet another object of the present invention to limit access to file or data blocks to the specific application node from which the request originated.

It is also an object of the present invention to more strictly enforce lease grants, as provided herein.

Lastly, but not limited hereto, it is an object of the present invention to reduce the transactional overhead in data transfer operations occurring in multinode, shared storage data processing environments.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

Figure 1:
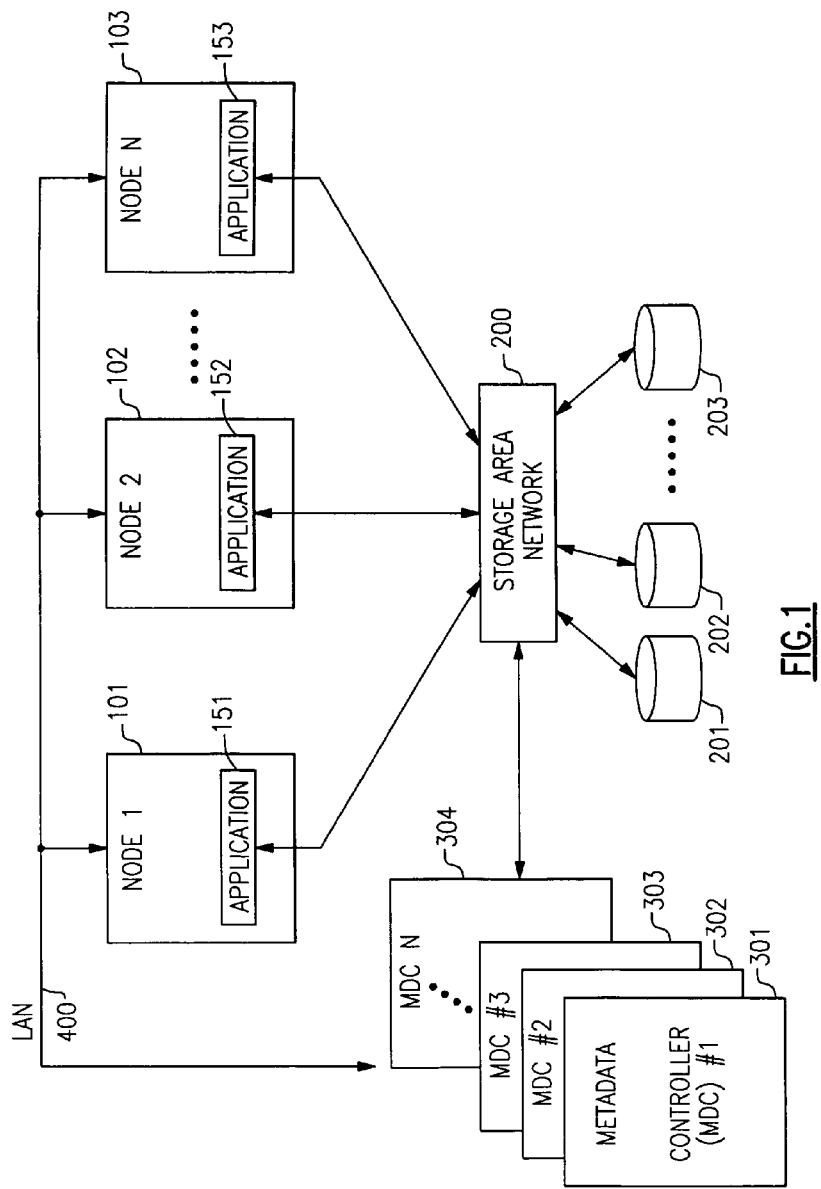
FIG. 1 is a schematic diagram illustrating the environment in which the present invention is employed and further illustrating its use in that environment.

The process of the present invention is implemented via the use of a standard file system as the metadata controller. This file system performs normal file system operations within the computing system where it resides. Specifically, it manages a collection of disks which makeup the file system and performs operations which assign disk blocks to files and manages the available free disk space on the disks assigned to the file system. File systems supporting one of the assignee's Storage Area Network products (Sanergy) are provided with interfaces which extend the normal file system interfaces by exporting the disk addresses which comprise the file system and also include a guarantee that these disk addresses are valid for a period of time (the lease period).

Thus, the sequence of operation is that the application residing on a system other than the metadata controller opens a file and accesses data. The Sanergy client function intercepts these calls transparently to the application. It then interacts with the metadata controller interface on the client to acquire the disk addresses which comprise the file and a guarantee with a time expiration that the file will not be moved nor will the disk blocks be reallocated to another file for that period of time. If the client application is extending a file which requires that more disk blocks are to be allocated to the file, this is also be done through this path.

GPFS is a fully symmetric shared disk file system and there are a number of GPFS related patents which describe techniques for locking across multiple compute machines. See for example, U.S. Pat. No. 5,974,424 titled "Parallel File System and Method with Metadata Node" issued to Schmuck et al. and assigned to the same assignee as the present invention. "Fully symmetric" means that metadata is handled on all machines which have access to the shared disks. Workloads which create and delete large numbers of files are not serialized on the capabilities of a single machine. This results in better scaling and improved fault tolerance. The difficulty with the fully symmetric approach is that a full file system instance must exist on all systems which need to access the data or else the data must be accessed through a network file system. The network file systems are restricted in performance due to wide area network protocols inherent in such access. The implementation of a full GPFS instance on all machine types which may be of interest to users is a prohibitively expensive proposition. Implementation of Storage Area Network file system extenders is easier because of the limited function at the application nodes is easier to manage. This is reflected in the fact that GPFS supports only two operating systems while assignee's Sanergy product supports many.

The invention described here is a hybrid which uses the fully symmetric capabilities of a set of cooperating GPFS systems to provide scalable metadata service to a wider cluster. In the target implementation, the GPFS cluster comprises a sufficient number of systems to provide metadata service as well as to serve any applications which run directly on the cluster. The present invention provides parallel metadata service from any of the nodes of the cluster and the Sanergy clients can be assigned to GPFS nodes for service in any way. For example, one could statically assign clients in a round robin fashion to servers to spread the metadata load across the servers or use other algorithms based on a knowledge of the anticipated workload.

A central feature of the present invention is its ability to provide the desired degree of coordination between servers which provide metadata access to Storage Area Network clients. This is achieved through an extension of the metanode concept for GPFS as described in U.S. Pat. Nos. 5,987,477; 5,974,424; 6,023,706; and 6,032,216. As described therein a metanode is a dynamically assigned member of the GPFS cluster which acts as the central repository of current state information about a file. This concept is extended herein to include the information required for external Storage Area Network access to GPFS files. Specifically, the present invention carries out certain actions which support this goal. In particular, these actions include exporting disk addresses which make up the a GPFS file. This information is provided to a requesting node which is not specifically designated as a metadata control node. These disk addresses are guaranteed to be valid for a specific duration or until they are released. Such release is typically initiated by the originally requesting node. This is the node that is not specifically designated as a metadata control node. Extra disk blocks are assigned to a file when requested; these are released either by the client or by recovery. All of these activities are provided so as to occur in a way that allows the same file to be accessed by clients which access their metadata through different GPFS systems.

In order to have a set of disk addresses exported, the node which exports it creates a pseudo-open of the file which represents the export of the file. It acquires locks on the inode which block any node from doing the following operations: (1) truncation of the file (since that could result in invalid disk blocks); and (2) deletion of the file (since that could free up disk blocks). These operations do not come into full effect until the export of the disk addresses is complete (that is, all leases on the file expired or are relinquished). Additionally, utility functions, normally provided for defragmentation and restriping purposes, defer their operations on files which have their disk addresses exported because they could also potentially relocate disk blocks which are known to the Storage Area Network or to other network clients. These utility applications conflict with the locks held on behalf of the Storage Area Network client and their operations on the specific file are deferred until the locks are freed.

In the method of the present invention, the time limited lease allows an application node to directly access the disk blocks that make up a file. In this regard, it is noted that what is here deemed as being an "application node" is a node that is not normally configured to act as a metadata controller, that is, it is a node that does not normally include metadata information and which does not act as a provider of file access. The role of access provider and "owner" of metadata is fulfilled by metadata control nodes acting in the capacity of metadata controllers. The metadata control nodes are often present in a group referred to as a metadata controller cluster. In order to grant a lease to an application node, a node which is actually a metadata control node first acts by obtaining a lock from the system lock manager, in a manner described, for example, in U.S. Pat. No. 5,974,424. In addition to a state indicator which indicates that a lock on the file is not currently being held, the lock also provides indicia of two other states: a first state which permits the granting of a lease without "consulting with" another metadata controller nodes; and a second state which permits the granting of a lease but only in "consultation with" a previously assigned metanode for the file. Different metadata controller nodes can exist for different files depending on file usage.

An understanding of the operation of the method of the present invention is also enhanced by considering the following example. Suppose that the data processing environment includes two application nodes, referred to herein as node $A_1$ and node $A_2$. Suppose also that there are two metadata controller nodes, referred to herein as node $M_1$ and node $M_2$. Lastly, suppose that there are two files to be accessed, file $F_1$ and file $F_2$ and that node $A_1$ is configured to use node $M_1$ as the metadata controller node and that $A_2$ is configured to use node $M_2$ as the metadata controller node. This is not meant to imply, however, that this assignment is a permanent one; it merely serves to better characterize the current example. If an application running on node $A_1$ wishes to use file $F_1$, then node $A_1$ contacts metadata controller node $M_1$. Node $M_1$ acquires a lock to become the metadata node for file $F_1$ and grants a lease to application node $A_1$. If an application running on node $A_2$ wishes to use file $F_2$, then node $A_2$ contacts metadata controller node $M_2$. Node $M_2$ acquires a lock to become the metadata node for file $F_2$ and grants a lease to application node $A_2$. If now an application running on node $A_2$ also wishes to access file $F_1$, then node $A_2$ contacts node $M_2$ to acquire a lease. Node $M_2$ attempts to become the metadata controller node for file $F_1$ by acquiring the lock. However, under the circumstances set forth, this attempt fails because $M_1$ already holds the lock and is granted the lock in a weaker mode. This weaker node status forces node $M_2$ to contact node $M_1$ for the lease which is relayed to node $A_2$. The weak mode locking status provides an indication to recovery processes that node $M_2$ has an interest in file $F_1$ in the event of failure of node $M_2$. A node holding the lock in the weak mode is only permitted to grant leases with the consent of a node holding a stronger lock. The locking mechanism allows any MDC capable node in the network to temporarily manage leases for a file. If node $A_1$ had relinquished the lease prior to node $A_2$'s request to access file $F_1$, then node $M_2$ would have succeeded in becoming the metadata node controller for the file.

Figure 2:
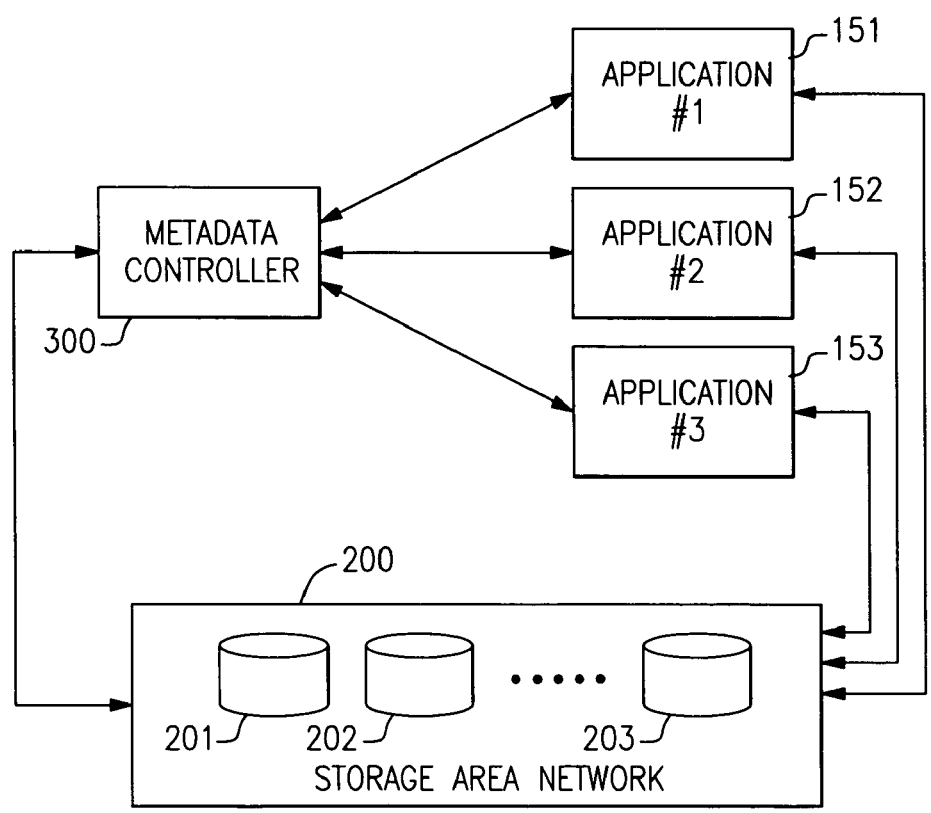
FIG. 2 is a schematic diagram illustrating the existence of bottleneck problems that are solved through the use of the present invention.

The present invention may also be better appreciated from the systems illustrated in FIGS. 1, 2, 3, and 4. FIG. 1 is a block diagram illustrating the environment in which the present invention is typically employed. In particular, the system includes Node #1 (reference numeral 101), Node #2 (reference numeral 102) and an $N^{th}$ node 103. These nodes include one or more data processing or central processing units and locally available storage, most often in the form of a Random Access Memory (RAM). This memory contains the program and data structures used to carry out the data access methods described herein. These nodes also typically include local non-volatile storage devices such as a rotating disk memory which is also capable of storing programming capable of causing the individual nodes to carry out the steps of the present method. The nodes illustrated (101-103) also include running Application programs 151 through 153, respectively. It is the data access requirements induced by these running Applications that can produce the undesirable system bottlenecks referred to above. In particular, in systems and networks in which relatively large amounts of data need to be stored, manipulated, retrieved and transmitted, it is often desirable to employ storage systems referred to as Storage Area Networks (SAN). Application programs 151 through 153 vie for access to data stored in SAN 200 shown in FIG. 1. The typical SAN includes a plurality of disk drives 201 through 203, as shown. Nodes 101, 103 and 103 in FIG. 1 are referred to herein as Application nodes. These are data processing nodes whose primary function is the processing of accessed data. Various parameters and configurations associated with these nodes may be specifically selected to optimize their performance not only as Application Nodes in general, but may be tuned to perform optimally for certain applications. The Application nodes are also particularly distinguished by the fact that they lack the full capability of acting as Metadata Controller nodes which, in contrast, are designed to be completely capable of controlling access to files stored in Storage Area Network 200. In particular, the Application Nodes do not have to be configured and tuned to operate as Metadata Controller (MDC) nodes, nor are their local storage systems normally burdened with the tasks associated with directly controlling access to SAN 200 so as to provide consistent, safe, an maintained access to various stored files. In systems other than those of the present invention, this access is mediated through a single Metadata controller node, as is depicted in FIG. 2. In the present invention, an application program's request for access to a file stored in SAN 200 is mediated through its Application Node (301-304). In preferred embodiments of the present invention, the relevant Application Node communicates with one of several possible Metadata Controller nodes (301-304) by means of signals sent over Local Area Network (LAN) 400. These signals are sent to nodes (301-304) which act as Metadata Controller nodes.

In one scenario indicative of the operation of the present invention, a Metadata Controller node which receives a request from an Application node first obtains a lock from the system lock manager. In the present invention, this lock includes a state indicator allowing the MDC node to grant a lease (time limited control access for a limited set of functions) to an Application node. Along with the lease there is provided a transfer of sufficient metadata to allow appropriate file access directly from the Application node itself, thus temporarily bypassing the MDC node. The lease includes a guarantee that no other operation truncates or deletes the file. All other file operations are permitted. It is further noted that the original request to a Metadata Controller node is directed to file access; likewise, the lease grant is also directed to the granularity of individual file structures.

Figure 3:
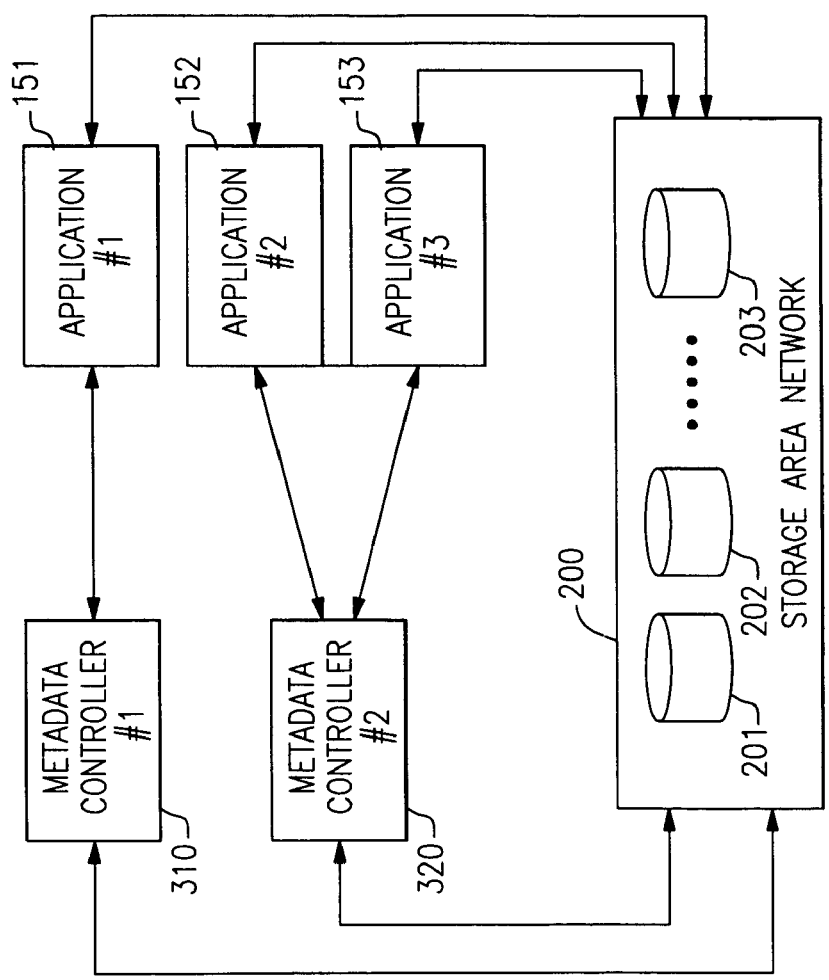
FIG. 3 is a schematic diagram similar to FIG. 2 but more particularly illustrating the present solution to the bottleneck problem.
Figure 4:
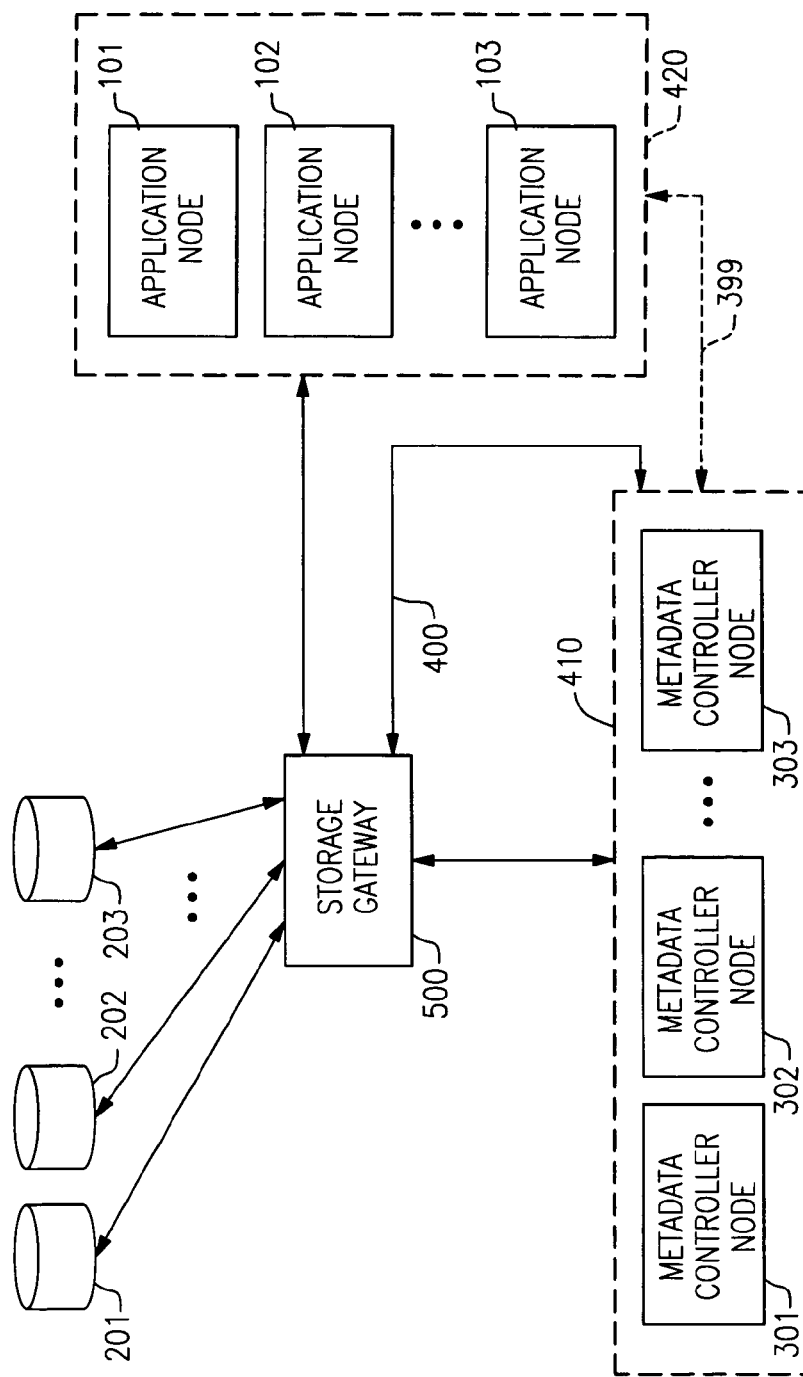
FIG. 4 is a schematic diagram illustrating the use of a storage gateway as a mechanism for enhancing security.

FIGS. 2 illustrates the state of affairs that would exist without the utilization of the present invention. FIG. 3 illustrates the concept that the system is now effectively provided with a plurality of Metadata Controller nodes which is made possible by the extended General Parallel File System (GPFS) locking structure of the present invention. It is also seen that the existence of this structure enhances file access in general, and in particular, file access in Storage Area Network environments is also improved. Thus, the GPFS implementation of parallel metadata service capabilities enhances the current state of the art by allowing parallel independent systems to serve as metadata controllers. This provides removal of bottlenecks and redundant services which correspondingly enhances fault tolerance capabilities.

The second aspect of the present invention builds on the first aspect. As pointed out the first aspect permits parallel independent data processing nodes to serve as metadata controllers. As implemented, a metadata controller node is provided with the capability of granting time limited access to a specific file so that an non-metadata controller node (such as an application node) can access the file directly. This provides the capability of permitting parallel metadata controller nodes to service to a plurality of application nodes which share access to a set of storage devices. This provides advantages in terms of performance because the processing power of multiple systems can be brought to bear on metadata intensive applications. The second aspect of the present invention addresses a second piece of this capability, namely, the ability to handle the failure of one of the metadata controller nodes.

During normal operation of the cluster of systems, disk addresses and guarantees for continued access are passed from a metadata controller node to an application node. The metadata controller node holds appropriate multinode locks which insure that no other metadata controller node permits a file operation which invalidates any of the access guarantees. More specifically, the set of metadata controller nodes does not allow the movement or deletion of data which has been guaranteed by a metadata controller node. To do so would allow possible data corruption on user files or on the metadata itself.

Since one of the objectives of using multiple metadata controllers is that the failure of one metadata controller does not block access to the file system from the application nodes, failure and recover operations are structured with due consideration for the existence of these guarantees. The General Parallel File System (as implemented on the assignee's pSeries and RS/6000 data processing products) employs recovery techniques for parallel lock recovery as described in the following U.S. Pat. Nos. 6,021,508; 5,950,199; and 5,974,424. The methods described therein are extended here to cover techniques for the handling of node failure with metadata guarantees in effect.

The operation of the metadata controller in the present invention provides two basic functions: (1) it returns the disk locations which comprise a file which has been opened by a user application and provides a guarantee that they will not change for a period of time; and (2) it assigns disk blocks to a file beyond what would normally be required to hold the data if the application node detects a pattern of writes which extends the file and, correspondingly, it releases any extra blocks for use when the file is closed.

Consideration is now directed to the processing that is desired when a metadata controller node fails. Here it is now important to note that the application nodes have independent paths to the storage devices; these paths must still be presumed to be operable and that these nodes continue to process data until their guarantee is expired. Prior to the present invention, it would be acceptable for normal GPFS lock recovery processes to process so as to release the locks held by the failing GPFS node which is acting as the metadata controller for one or more application nodes. The release of these locks under these circumstances would, however, make these disk blocks subject to the normal operation of other applications including such operations as deletion of the original user file and reassignment of the disk blocks to another user's files. This is clearly a very undesirable situation since it compromises data integrity and security. Accordingly, it is seen that the existence of these file access guarantees should be considered in the failure recovery process.

Attention is now directed to consideration of the three failure situations addressed by the failure recovery process of the present invention. The first situation occurs with the failure of a single node which is also a metadata controller node. The second situation is the failure of multiple metadata controller nodes but where none of the failed nodes is the node containing the file system manager. For purposes of the present invention, the file system manager is simply the node which issues the locks, as mentioned above. In order to obtain a lock, a potential metadata controller node sends a lock request to the file system manager. The third situation is the failure of the metadata controller node and the file system manager node. This third failure scenario is the most difficult since a second copy of the lock is contained with the stripe group manager. If only a metadata controller node fails, the scope of recovery is limited to the files known to be locked at that node. However, if both fail, the scope of possible locking is considered to be the entire file system. The dual scope of recovery is described for the non-metadata controller case in the three U.S. patents cited above.

In the case where a single node has failed, the following processing occurs. Normal GPFS lock recovery occurs on all files which do not have metadata controller locks on them. This frees up any files which were open for local processing on the failed metadata controller node. Normal processing is thereafter possible for any file which did not have a conflicting lock on the failed node. The next step in failure recovery is recovery operations for files which do have metadata controller locks. Most importantly for the present invention, this recovery is deferred for the time period of the longest guarantee (that is, for the longest access "lease" period). During this time, programs running on an affected application node may detect the loss of its active metadata controller node and request renewal of the guarantee on an alternate metadata controller node for this file system. If this occurs, the locks are transferred to that node and recovery is not required. If the guarantee expires, the locks on the file are released and the file is available for normal processing. If additional disk blocks have been assigned to the file, they are released as part of this final recovery.

In the case where multiple metadata controller nodes have failed; but none of them holds the master copy of the locks (that is, is the file system manager), the recovery is process as described above except that the file system manager is moved to another node and the locks are rebuilt.

In the case where multiple nodes have failed including and where this includes the stripe group manager, it is not known which files have existing "lease" guarantees assigned to them. In such circumstances, recovery for the entire file system is deferred until all possible guarantees expire. At the conclusion of that time period, the lock state reflecting the locks held by the surviving nodes are rebuilt at a newly appointed stripe group manager. All other locks are available. Application nodes which have guarantees from surviving metadata controller nodes are able to continue to operate as if there was no failure. No new guarantees are issued until the recovery process is complete.

Attention is now focused upon the third aspect of the present invention which builds upon the first aspect, but which also enjoys the indirect benefits provided by the failure handling capabilities of the second aspect of the present invention. Symmetric parallel clustered file systems such as IBM's General Parallel File System referred to above provide the capability of sharing data across the nodes which operate as part of the cluster. Such file systems provide coherent update of data from multiple applications running on different systems or from multiple instances of a parallel application. This capability is valuable in many user environments. The first aspect of the present invention includes the capability to use parallel file system structures as a metadata controller for a wider set of machines which share access to shared storage through connection to a storage mechanism such as a SAN (Storage Area Network). The third aspect of the present invention provides the capability for running application programs within the parallel cluster in conjunction with the presence of the parallel metadata controller function, as described above. This new feature provides what is, in effect, a hybrid data processing system which has some of the characteristics of symmetric parallel clusters and some of the characteristics of asymmetric clusters represented by the metadata controller implementation.

The symmetric cluster offers higher performance for applications which are metadata intensive. It also provides the capability for stronger enforcement of data consistency rules between instances of applications. The asymmetric capability also allows for more dynamic clustering with nodes joining and departing the cluster according to their needs. As provided by the locking mechanism herein, the asymmetric cluster nodes do not participate in file system structure rule enforcement and, conversely, their absence does not affect the operation of the core cluster.

The term "core cluster" is adopted herein to refer to the cluster which host the symmetric parallel file system. The term "extended cluster" is used to refer to the core cluster plus the set of nodes authorized to be a metadata controller client. The core cluster has the following characteristics:

- It is a fixed group of nodes with a communications link between them which provides shared access to a storage systems such as a set of disks or a Storage Area Network. The group can change by explicit user action, even during the execution of an application; but the set of members of the group and the operational state of each member of the group is known by all active members at all times.
- The communications link is robust enough so that an active set of data consistency protocols can be run which control access to the objects on the disk which make up a file system or file systems.
- Application programs which execute within the core cluster expect that the results of their execution are produced as if they were executed on a single node.
- Changes made by one instance of an application are immediately visible to another application. This includes changes in file size, file characteristics and file data.
- The extended cluster has the following characteristics:
- It consists of a core cluster plus a set of additional systems which all share a path to shared storage. The non-core systems have a communications link to one or more core cluster nodes. The non-core systems are not persistently active and their state is not known at all times.
- Non-core systems obtain access to a set of disk blocks which make up a file for a period of time with a set of guarantees that the core cluster does not allow any operation which makes access to these disk blocks invalid. This is accomplished by providing a locking structure which permits read and write access only to existing data blocks while denying access for purposes of file deletion or file truncation (block deletion). The guarantee does not involve any guarantees relative to the content of the disks. Applications which require stronger guarantees are ones that should be run in the core cluster.

The locking structure associated with the third aspect of the present invention provides the following properties and capabilities:

- A locking structure which suspends core cluster applications which conflict with the guarantees granted. Specifically, any operation which truncates or deletes the file is delayed until the guarantees granted to the non-core node have been released or have expired.
- A core application may read or write data blocks for files which have active guarantees because there are no guarantees as to the content of the data block. However, this does not dilute the "content rules" for multiple applications executing within the core cluster.
- A core cluster application may extend a file if conflicting application guarantees have not been granted. These extensions are not necessarily visible to the non-core application until the next time that the file is opened.
- It is possible that the core application does not see updates from non-core applications until the non-core application has closed the file.
- When a non-core node attempts to renew the guarantees (required periodically under the protocols set forth in the first aspect of the present invention), the core cluster applications are granted the locks prior to renewal for some period of time. The renewal process allows the non-core application to view any changes that were made prior to renewal completion and potentially perform other operations which conflict with the lease (or guarantees).

An even further extension to this locking capability provides an optional stronger locking mode. In this variation, the multi-node locking structure is strengthened by allowing guarantees to be granted only in the absence of locks being held by core cluster applications and by deferring core cluster application operations which occur while these guarantees are in effect. This provides single system semantics across the extended clusters and the core clusters, but allows some applications on the non-core nodes to see errors if they conflict with the application on the core nodes.

Application sets which could use the capability include such situations as: (1) video editing on core nodes and display on extended nodes; (2) technical computing on the core nodes and visualization on the extended nodes; (3) complex pattern searches on non-character data on the core nodes with results processing on the extended nodes. This provides a strong technical computing advantage in which a cluster of machines is put to work on a problem which involves cooperative effort between a set of tasks which utilize the computing power of multiple systems. This mechanism takes advantage of the core capabilities of GPFS, an already proven and stable file system platform. Metadata controller capabilities which are added herein to GPFS allow processors external to the core cluster to access the same data. The third aspect of the present invention thus puts the two capabilities together and allows parallel computation on the data as well as some degree of concurrent access to the same data. This is valuable for technical visualization applications which monitor the progress of parallel jobs by accessing the output of the jobs.

Attention is now focused on the fourth aspect of the present invention, namely that aspect which relates to security concerns. As described above, several aspects of the present invention relate to the use of storage area networks which allow the sharing of a set of storage devices from a collection of computer systems. There are a number of products in the marketplace which allow a file system to be created on these storage devices and which allow the direct sharing of data by passing disk addresses to the using systems. IBM's Sanergy is an example of a product that does this. One or more processor systems run full file system functions, assign disk addresses to data and allow the use of these disk addresses on other systems which run applications using this data directly. This capability provides higher speed access to data because it does not require that the data pass through a data server.

The use of this technique implies that application systems have complete addressability to all of the disks which may potentially contain data needed on those systems. In practice, this means they acquire addressability to the entire set of disks which make up the file system. This restricts the use of these techniques to application systems which can be trusted to enforce the security policy of the data and to not allow any access which doesn't go through the file system security protocols. This level of trust implies that they should be administered by trusted administrators who observe these rules. This is a potential limitation to the capabilities associated with storage area network file sharing.

Other aspects of the inventions described herein and the patents referred to above describe mechanisms for sharing files by passing disk addresses to the application nodes and by allowing their use for a period of time. This fourth aspect takes those mechanisms one step further by passing the list of disk addresses, the authorized computer system and the time period for which the access is valid to a disk gateway through which the disk access occurs. This disk gateway only allows disk access to the shared data to proceed if the computer system making the disk access is currently authorized to have access to the indicated disk blocks. Access to other disk blocks is denied. This precludes any possibility that a highly authorized user at an application node can access data which is not properly available to that user.

Accordingly, the fourth aspect of the present invention employs a storage network which comprises three principal elements:

a set of disks which are only available to application nodes through a storage gateway (an example of such a gateway is IBM's Virtual Shared Disk server nodes; other disk controller protocols may also be employed);

a metadata controller system or a cooperating set of metadata controller systems which allocate files within the file system and validate access to the data; and an application system which requests disk addresses associated with a file from the metadata controller and accesses the disk addresses through the storage gateway, wherein the application system provides credentials to the metadata controller along with its access request.

The major data process flow for this security protocol is for the application program running on one of the application nodes (101, 102 or 103 in node group 420 in FIG. 4) to open a new or an existing file. This results in an access to one of the metadata controller nodes 301, 302 or 303 in node group 410 via path 399 to obtain the disk addresses which make up an existing file or which can be used for a new file (as stored on disks 201, 202 or 203 in FIG. 4). This much of the protocol can be found in IBM's existing Sanergy product. The addition herein is that the metadata controller also provides the same disk list with the identity of the authorized node to storage gateway 500 via path 400. The storage gateway also receives a duration for which this access is to be allowed. Generally, it is the responsibility of the application system to renew its access before this duration expires in order to insure uninterrupted access. The storage gateway enforces that access so that access from an application node is restricted to disk addresses for which it has current authorization.

The protocols of the fourth aspect of the present invention provide restricted access to shared data, based on access requests from application nodes, by limiting access to data blocks for which the application node has explicit authorization. Current practice restricts access to trusted systems because many files reside within shared storage. If a user on an application node has system level privileges, that user would normally have full access to the entire device under current implementations. With the protocols set forth in the fourth aspect of the present invention, access is restricted to those data blocks that for which a currently logged on user has authenticated access. In many cases of shared storage access, the usage of an application node is limited to a single user and thus, that user must have credentials for the file. Having root access on a personal system does not permit bypassing the security protocols provided herein.

There are two basic solutions in the industry to the security problem addressed herein:

One is the use of trusted application systems (nodes) which individually handle file system access enforcement. This requires that a trusted entity manage the system. While this is acceptable in many cases, it is often not acceptable when that application system is dedicated to the support of a single user or a small group of collaborating users.

There have been a number of proposals to associate a file identity with a disk block in the disk subsystem. This adds "fileidentity" as an attribute of the disk block. This proposal has been discussed under various initiatives for object based disks or for object based storage devices. However, this solution requires that extensions be made to the current disks. The solution proposed herein does not require changes to the disks since the association of disk block to file persistently exists only in the file system and also in the storage gateway while the file is open.

Clearly it is seen that, for the reasons stated, the process and protocols described herein provide a superior solution.

From the above it should therefore be seen that the present invention solves the problem of failure in a parallel metadata controller environment. The prior state of the art included only metadata controllers where the failure of the single node causes the entire file system to become unavailable. With a parallel metadata controller, partial failures become possible and accordingly, a mechanism is provided to protect the continuing operations on the surviving side from the operational failure due to dependence on a failed component. Additionally, the present invention, in at least one of its aspects, provides a mechanism which exploits metadata controller nodes so as to make them available for application programming, particularly in environments involving visualization of data as it is being transformed in numerically intensive operations. It is also seen that security issues in shared file systems are addressed through the use of checking and comparison protocols provided within a storage gateway.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for accessing data in a shared storage environment, said method comprising the steps of:

establishing metadata file system control structures on at least some of a plurality of data processing nodes which share access to a set of data storage devices to allow at least some data processing nodes to act in parallel as metadata controller nodes;

coordinating usage of said metadata controller nodes acting in parallel, including for each of said metadata controller nodes acting in parallel: sending a request to a first node acting as a metadata controller node, to grant access to a file which is resident within said set of storage devices, said request being sent from a second node, which is acting as an application node and not as a metadata-controller node, and which does not belong to said metadata controller nodes;

providing a lock for use by said first node, in response to said request, wherein said lock includes permission for said first node to allow said second node to directly access said file for a limited period of time, such that said first node acts as the metadata controller for said file via said lock;

transferring metadata information pertaining to said file to said second node; and accessing said file during said limited time from said second node using said transferred metadata information.

2. The method of claim 1 in which said shared storage environment includes a storage area network.

3. The method of claim 1 in which said request is transmitted over a Local Area Network.

4. The method of claim 1 in which said lock further includes an indication that the granting of said permission is conditioned on coordination with a third node which also contains metadata for accessing said file.

5. The method of claim 1 further including the step of renewing said grant of access during said limited time period.

6. The method of claim 1 further comprising the step of:
providing recovery mode capabilities to said plurality of nodes possessing metadata controller capabilities, such that said nodes are able to provide said metadata controller capabilities in the event of node failure.

7. A multinode data processing system comprising:
a plurality of data processing nodes, at least some of which have metadata file system control structures established thereon to allow said at least some data processing nodes to act in parallel as metadata controller nodes;
a set of storage devices, access to said set of storage devices being shared by said plurality of data processing nodes;
metadata protocol coordinating usage of said metadata controller nodes acting in parallel, including for each of said metadata controller nodes acting in parallel: sending a request to a first node, acting as a metadata controller node, to grant access to a file which is resident within said set of storage devices, said request being sent from a second node, which is acting as an application node and not as a metadata-controller node, and which does not belong to said metadata controller nodes; providing a lock for use by said first node, in response to said request, wherein said lock includes permission for said first node to allow said second node to directly access said file for a limited period of time, such that said first node acts as the metadata controller for said file via said lock; trasferring metadata information pertaining to said file to said second node; and accessing said file during said limited time from said second node using said transferred metadata information.

* * * * *